US010063707B2

United States Patent
Hu et al.

(10) Patent No.: US 10,063,707 B2
(45) Date of Patent: Aug. 28, 2018

(54) METHOD, DEVICE AND VIDEO CONFERENCE SYSTEM FOR DETECTING VIDEO SIGNALS IN SAME STANDARD

(71) Applicant: ZTE CORPORATION, Guangdong (CN)

(72) Inventors: Zhongzhong Hu, Guangdong (CN); Bo Sun, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 5 days.

(21) Appl. No.: 15/515,820

(22) PCT Filed: Jun. 30, 2015

(86) PCT No.: PCT/CN2015/082942
§ 371 (c)(1),
(2) Date: Mar. 30, 2017

(87) PCT Pub. No.: WO2016/050106
PCT Pub. Date: Apr. 7, 2016

(65) Prior Publication Data
US 2017/0310825 A1    Oct. 26, 2017

(30) Foreign Application Priority Data

Sep. 30, 2014   (CN) .......................... 2014 1 0524890

(51) Int. Cl.
*H04M 3/56*     (2006.01)
*H04N 7/15*     (2006.01)
*H04N 7/14*     (2006.01)

(52) U.S. Cl.
CPC ............. *H04M 3/567* (2013.01); *H04M 3/56* (2013.01); *H04N 7/147* (2013.01); *H04N 7/15* (2013.01); *H04M 2201/60* (2013.01)

(58) Field of Classification Search
None
See application file for complete search history.

(56) References Cited

U.S. PATENT DOCUMENTS

2008/0049103 A1    2/2008  Nakagawa
2009/0213267 A1    8/2009  Musunuri et al.
(Continued)

FOREIGN PATENT DOCUMENTS

CN    101610406 A    12/2009
CN    101854487 A    10/2010
(Continued)

OTHER PUBLICATIONS

International Search Report dated Aug. 26, 2015 issued in PCT/CN2015/082942.
(Continued)

*Primary Examiner* — Stella Woo
(74) *Attorney, Agent, or Firm* — Scully Scott Murphy & Presser

(57) ABSTRACT

A method for detecting video signals in a same format includes: receiving video signal data output from any one of at least two signal sources in a same format; identifying a start position and an end position of valid data from the received video signal data; counting number of rows and number of columns of a complete frame of received data according to the identified start and end positions of the valid data; and determining, when the counted numbers of rows and columns corresponding to two adjacent complete frames of data do not conform with each other, the received video signal data is switched, and sending out the determined result.

14 Claims, 3 Drawing Sheets

(56) References Cited

U.S. PATENT DOCUMENTS

2010/0164962 A1 7/2010 Sakariya et al.
2013/0307919 A1* 11/2013 Taubin .................... H04N 7/15
                                                    348/14.02
2017/0127056 A1* 5/2017 Batmunkh ............. H04N 17/02

FOREIGN PATENT DOCUMENTS

| CN | 102368816 A | 3/2012 |
| EP | 502 673 A2 | 9/1992 |
| GB | 2 310 558 A | 8/1997 |

OTHER PUBLICATIONS

Supplementary European Search Report dated Oct. 11, 2017 issued in European Application No. 15 84 6006.

* cited by examiner

METHOD, DEVICE AND VIDEO CONFERENCE SYSTEM FOR DETECTING VIDEO SIGNALS IN SAME STANDARD

CROSS-REFERENCE TO RELATED APPLICATIONS

This application is the 371 application of PCT Application No. PCT/CN2015/082942 filed Jun. 30, 2015, which is based upon and claims priority to Chinese Patent Application No. 201410524890.6, filed Sep. 30, 2014, the entire contents of which are incorporated herein by reference.

TECHNICAL FIELD

The present disclosure relates to the field of communication technology and, more particularly, to a method and an apparatus for detecting video signals in a same format as well as a video conference system.

BACKGROUND

In video conference systems, multiple cameras are commonly used to obtain different conference scenarios as input signals for conference terminals. For ease of operation, video switching matrix is often used to switch between different input video sources. For now, the video signal is generally collected and identified using an AD converter. However, as the video switching matrix performs switching of video input signals in the same format, a detection mechanism of the AD chip is often unable to recognize changes of rapid signals, which may cause issues such as image split at a distal end of the video conference system.

The detection mechanism of the AD converter for the video signal is based on width and height statistics and counting of the video signal, and width data of successive 128 rows of video signals is processed to determine a threshold. Then, comparison is made according to the determined threshold and each next row of video data; if they are equal, the signal is deemed continuous; and if not, the signal is discontinuous.

This detection method is defective. As video signals in the same format are equal in width and height, the signal change often cannot be effectively determined in fast switching, based on this commonly used detection mechanism, thus they may still be deemed as continuous video signal. Therefore, it is necessary to provide a method for detecting video signals in the same format, which is able to recognize the change in fast signal.

This section provides background information related to the present disclosure which is not necessarily prior art.

SUMMARY

In order to solve at least the problem described above in related art, there are provided a method and an apparatus for detecting video signals in a same format as well as a video conference system by embodiments of the disclosure, where FPGAs (Field Programmable Gate Arrays) may be used to detect the video signal data, such that the fast change of signal can be recognized by counting the number of rows and columns of the valid data.

In order to solve the problem described above, following solutions are provided by embodiments of the disclosure.

According to an embodiment of the disclosure, there is provided a method for detecting video signals in a same format, including:

receiving video signal data output from any one of at least two signal sources in a same format;

identifying a start position and an end position of valid data from the received video signal data;

counting number of rows and number of columns of a complete frame of received data according to the identified start and end positions of the valid data; and determining, when the counted numbers of rows and columns corresponding to two adjacent complete frames of data do not conform with each other, the received video signal data is switched, and sending out the determined result.

In an embodiment, the method further includes: determining, when the counted numbers of rows and columns corresponding to two adjacent complete frames of data conform with each other, the received video signal data is not switched, and sending out the determined result.

In an embodiment, the identifying a start position and an end position of valid data from the received video signal data includes:

identifying a start position and an end position of blanking data from the received video signal data; and identifying, beginning from the end position of the blanking data, the start and end positions of the valid data from the received video signal data.

In an embodiment, the identifying a start position and an end position of blanking data from the received video signal data includes:

identifying the start and end positions of the blanking data by comparing the received video signal data with video signal of a standard format.

In an embodiment, the identifying, beginning from the end position of the blanking data, the start and end positions of the valid data from the received video signal data includes:

comparing, beginning from the end position of the blanking data, the received video signal data with video signal of a standard format to identify the start and end positions of the valid data.

In an embodiment, when the video signal data is analog video signal data, the method, prior to the receiving video signal data output from any one of at least two signal sources in a same format, comprises:

converting the analog video signal data into digital video signal data.

According to another embodiment of the disclosure, there is provided an apparatus for detecting video signals in a same format, including:

a receiving module configured to receive video signal data output from any one of at least two signal sources in a same format;

an identification module configured to identify a start position and an end position of valid data from the received video signal data;

a counting module configured to calculate number of rows and number of columns of a complete frame of received data according to the identified start and end positions of the valid data; and a transmission module configured to determine, when the counted numbers of rows and columns corresponding to two adjacent complete frames of data do not conform with each other, the received video signal data is switched, and send out the determined result.

In an embodiment, the transmission module is configured to determine, when the counted numbers of rows and columns corresponding to two adjacent complete frames of data conform with each other, the received video signal data is not switched, and send out the determined result.

In an embodiment, the identification module is configured to:

identify a start position and an end position of blanking data from the received video signal data; and identify, beginning from the end position of the blanking data, the start and end positions of the valid data from the received video signal data.

In an embodiment, the identification module is configured to identify the start and end positions of the blanking data by comparing the received video signal data with a standard format of video signal.

In an embodiment, the identification module is configured to compare, beginning from the end position of the blanking data, the received video signal data with a standard format of video signal to identify the start and end positions of the valid data.

In an embodiment, when the video signal data received by the receiving module is analog video signal data, the apparatus further includes an AD conversion module configured to convert the analog video signal data into digital video signal data.

According to another embodiment of the disclosure, there is provided a video conference system including at least two video capture devices, a video switching matrix device, and a video conference terminal, wherein the video conference terminal comprises the apparatus for detecting video signals in a same format described above.

In an embodiment, the video conference terminal further includes a successive processing module configured to receive determined result and video signal transmitted from the apparatus for detecting video signals in a same format, and process the received video signal.

According to still another aspect, the present disclosure provides an apparatus for detecting video signals in a same format, including: a processor; and a memory configured to store instructions executable by the processor; wherein the processor is configured to perform: receiving video signal data output from any one of at least two signal sources in a same format; identifying a start position and an end position of valid data from the received video signal data; counting number of rows and number of columns of a complete frame of received data according to the identified start and end positions of the valid data; and determining, when the counted numbers of rows and columns corresponding to two adjacent complete frames of data do not conform with each other, the received video signal data is switched, and sending out the determined result.

According to yet still another aspect, the present disclosure provides a non-transitory computer-readable storage medium having stored therein instructions that, when executed by a processor of a video processing device, causes the video processing device to perform a method for detecting video signals in a same format, the method including: receiving video signal data output from any one of at least two signal sources in a same format; identifying a start position and an end position of valid data from the received video signal data; counting number of rows and number of columns of a complete frame of received data according to the identified start and end positions of the valid data; and determining, when the counted numbers of rows and columns corresponding to two adjacent complete frames of data do not conform with each other, the received video signal data is switched, and sending out the determined result.

At least following advantageous effect can be achieved by embodiments of the disclosure.

According to the method and apparatus for detecting video signals in a same format as well as the video conference system provided by embodiments of the disclosure, after video signal data output from any one of at least two signal sources in a same format is received, a start position and an end position of valid data are identified from the video signal data, and number of rows and number of columns of a complete frame of received data are further counted; then it is determined that, when the counted numbers of rows and columns corresponding to two adjacent complete frames of data do not conform with each other, the video signal data is switched, and the determined result is sent out, such that issues like image splitting at the distal end of the video conference can be avoided.

Therefore, the method for detecting video signals in a same format according to embodiments of the present disclosure is different from the detection on width only of the video signal data, but statistical calculation is performed on the blanking lines and the valid lines inside the data, such that it is very easy to recognize whether the current data is a complete frame of invalid image. In an application scenario of the disclosure on fast switching of video signal, the video signal with variations can be effectively detected.

This section provides a summary of various implementations or examples of the technology described in the disclosure, and is not a comprehensive disclosure of the full scope or all features of the disclosed technology.

BRIEF DESCRIPTION OF THE DRAWINGS

The accompanying drawings, which are provided for further understanding the technical solution of the present application and which form a part of the specification, are used in conjunction with the embodiments of the present application to explain the technical solution of the present application and do not constitute a limitation on the technical scope of the present application.

DETAILED DESCRIPTION

Figure 1:
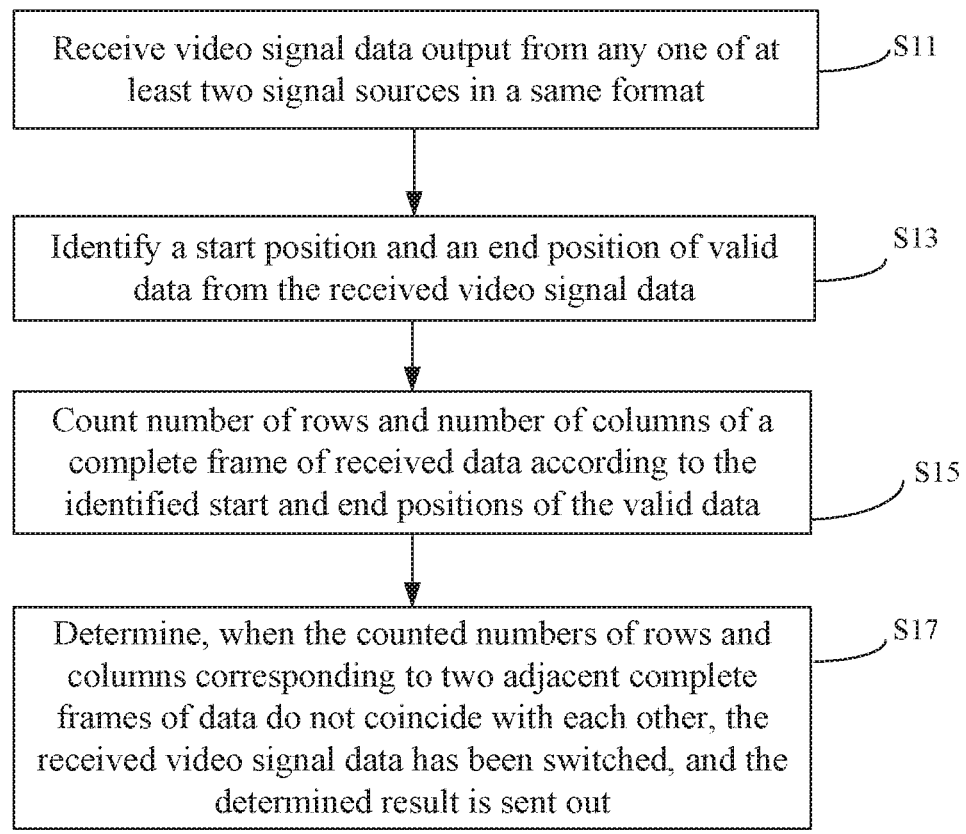
FIG. 1 is a flow chart illustrating a method for detecting video signals in a same format according to an embodiment of the disclosure.

Exemplary embodiments of the present disclosure will be described in more detail below with reference to the accompanying drawings. While the exemplary embodiments of the present disclosure are shown in the drawings, it should be understood that the present disclosure may be embodied in various forms and should not be limited to the embodiments set forth herein. Rather, these embodiments are provided to enable a more thorough understanding of the present disclosure and to provide a complete disclosure of the scope of the disclosure to those skilled in the art.

Embodiment 1

According to the method for detecting video signals in a same format provided by embodiments of the disclosure, video signal data output from any one of at least two signal sources in a same format is firstly received; then a start position and an end position of valid data are identified from the received video signal data; and number of rows and number of columns of a complete frame of received data are further counted according to the identified start and end positions of the valid data; then it is determined that, when the counted numbers of rows and columns corresponding to two adjacent complete frames of data do not conform with each other, the received video signal data is switched, and the determined result is sent out.

As shown in FIG. 1, which is a flow chart illustrating a method for detecting video signals in a same format according to an embodiment of the disclosure, the method includes following steps.

In step S11, video signal data output from any one of at least two signal sources in a same format is received.

In an embodiment, when the video signal data is analog video signal data, the method, prior to the video signal data output from any one of at least two signal sources in a same format is received, includes converting the analog video signal data into digital video signal data.

In step S13, a start position and an end position of valid data are identified from the received video signal data.

Since blanking data and valid data of the video signal data are alternately arranged, that is, the end position of any one blanking data corresponds to the starting position of the next valid data. In order to be able to accurately recognize the start and end positions of the valid data, the received video signal data can be first compared with a standard format of video signal to identify the start and end positions of a certain blanking data. Then, starting from the end position of the blanking data, the received video signal data is compared with the standard format of video signal to identify the start and end positions of the valid data adjacent to the blanking data.

In step S15, number of rows and number of columns of a complete frame of received data are counted according to the identified start and end positions of the valid data.

Since a seamless connection is impossible between video signal data before and after a video switching, it is possible to detect whether or not a signal switching occurs by counting the number of rows and the number of columns corresponding to a complete frame of the received data.

In step S17, it is determined, when the counted numbers of rows and columns corresponding to two adjacent complete frames of data do not conform with each other, the received video signal data is switched, and the determined result is sent out.

Since the seamless connection is impossible between video data before and after switching, a mismatch will be detected between the numbers of rows and columns corresponding to a complete frame of the received data derived in a certain counting and that derived in an adjacent counting, as long as the switch occurs in the video signal data. As the detection result is sent out, issues such as image splitting at distal end of the video conference can be effectively avoided.

Embodiment 2

Figure 2:
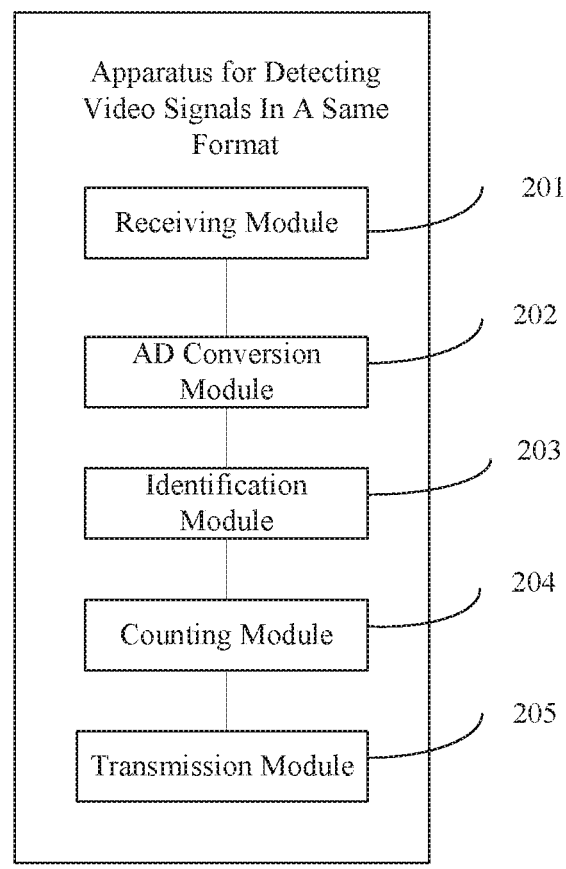
FIG. 2 is a block diagram illustrating an apparatus for detecting video signals in a same format according to an embodiment of the disclosure.

As shown in FIG. 2, which is a block diagram illustrating an apparatus for detecting video signals in a same format according to an embodiment of the disclosure, the apparatus includes:

a receiving module 201 configured to receive video signal data output from any one of at least two signal sources in a same format;

an identification module 203 configured to identify a start position and an end position of valid data from the received video signal data;

a counting module 204 configured to calculate number of rows and number of columns of a complete frame of received data according to the identified start and end positions of the valid data; and a transmission module 205 configured to determine, when the counted numbers of rows and columns corresponding to two adjacent complete frames of data do not conform with each other, the received video signal data is switched, and send out the determined result.

In an embodiment, when the video signal data received by the receiving module 201 is analog video signal data, the apparatus further includes an AD conversion module 202 configured to convert the analog video signal data into digital video signal data.

According to the apparatus for detecting video signals in a same format provided by embodiments of the disclosure, when video signal data output from a certain signal source is received by the receiving module 201, the identification module can be triggered to identify a start position and an end position of valid data from the video signal data, and then the counting module 204 is triggered to calculate the number of rows and the number of columns of a complete frame of received data according to the identified start and end positions of the valid data; if the counted numbers of rows and columns corresponding to two adjacent complete frames of data do not conform with each other, the transmission module 205 determines that the received video signal data is switched and sends out the determined result.

In an embodiment, the transmission module 205 is also configured to determine, when the counted numbers of rows and columns corresponding to two adjacent complete frames of data conform with each other, the received video signal data is not switched, and send out the determined result.

In an embodiment, the identification module 203 is further configured to:

identify a start position and an end position of blanking data from the received video signal data; and identify, beginning from the end position of the blanking data, the start and end positions of the valid data from the received video signal data.

In an embodiment, the identification module 203 is further configured to identify the start and end positions of the blanking data by comparing the received video signal data with a standard format of video signal.

In an embodiment, the identification module 203 is further configured to compare, beginning from the end position of the blanking data, the received video signal data with a standard format of video signal to identify the start and end positions of the valid data.

Embodiment 3

According to another embodiment of the disclosure, there is also provided a video conference system including at least two video capture devices, a video switching matrix device, and a video conference terminal, and the video conference terminal includes the apparatus for detecting video signals in a same format as described above.

In an embodiment, the video conference terminal further includes a successive processing module configured to receive determined result and video signal transmitted from the apparatus for detecting video signals in a same format, and process the received video signal.

Figure 3:
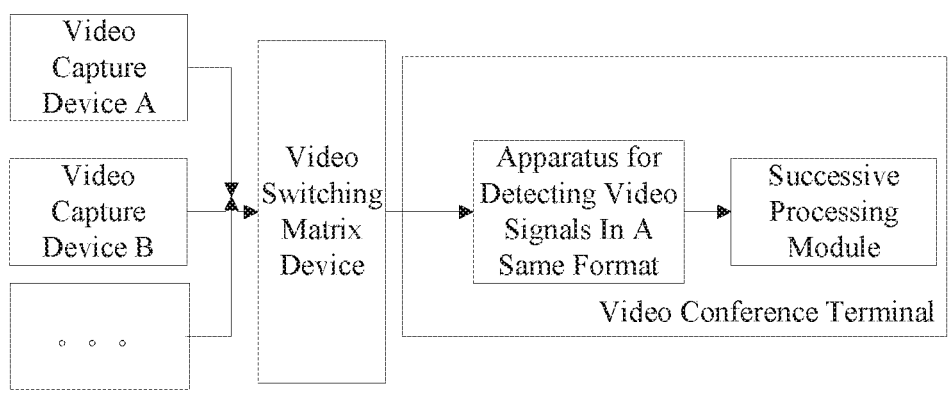
FIG. 3 is a block diagram illustrating a video conference system according to an embodiment of the disclosure.

As shown in FIG. 3, the video capture devices A and B, which may be adjusted to be signal sources in the same format, access the video conference terminal via the video switching matrix device, and rapid switching of signal may be performed through identification of the apparatus for detecting video signals in the same format. Herein, the video capture device may be a digital or analog camera. If it is a digital camera, following there may be connected an apparatus for detecting video signals in the same format without an AD conversion module. If it is an analog camera, following there may need to be connected an apparatus for detecting video signals in the same format with the AD conversion module.

Figure 4:
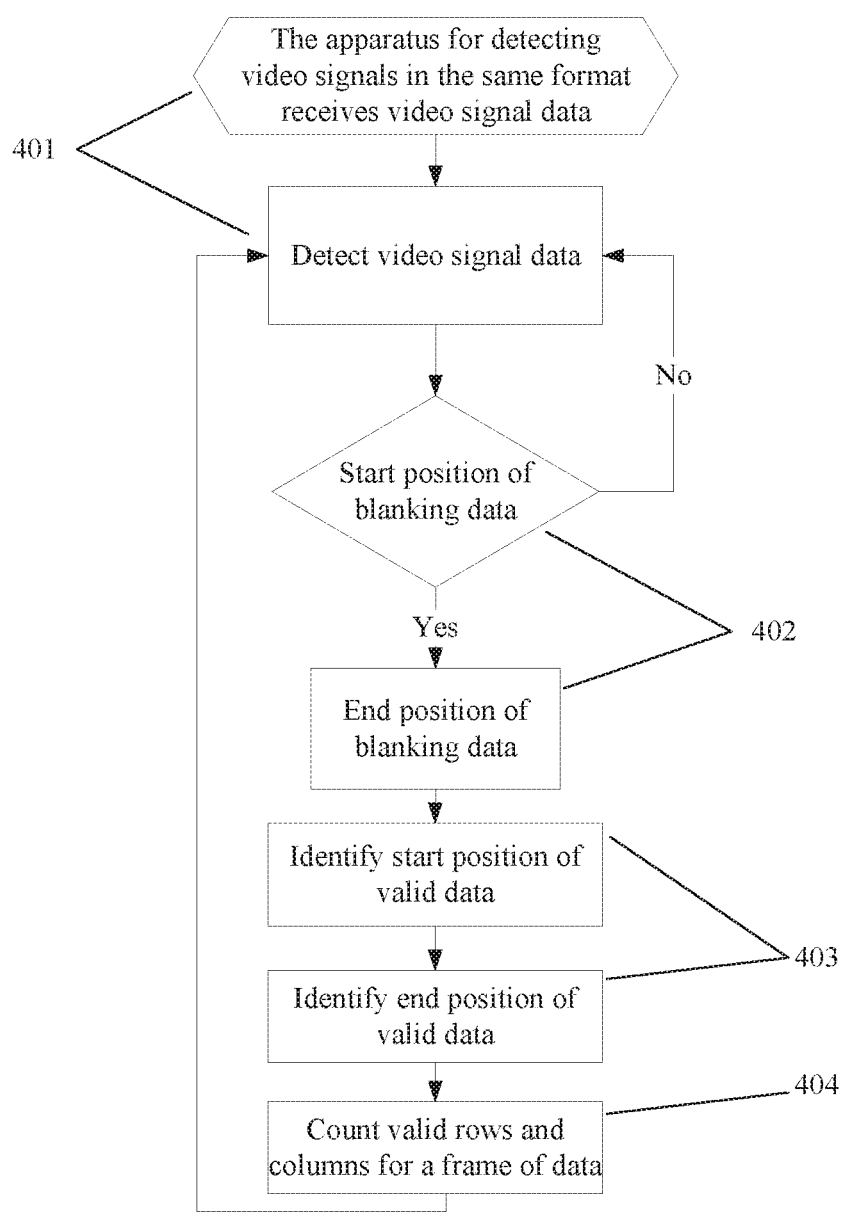
FIG. 4 is a flow chart illustrating an exemplary application of the method for detecting video signals in a same format according to an embodiment of the disclosure.

FIG. 4 is a flow chart illustrating an exemplary application of the method for detecting video signals in a same format according to an embodiment of the disclosure. FIG. 4 will be described with reference to FIG. 3 as follows.

In step 401, the apparatus for detecting video signals in the same format receives the video signal data constantly, and detects and identifies the incoming video signal data successively.

In step 402, the apparatus for detecting video signals in the same format successively reads values of the incoming signal and makes comparison, so as to identify the start position and the end position of the blanking data according to the standard format of video signal. That is, step 401 is performed continuously unless the start position of the blanking data is identified, so that the end position of the blanking data can be sequentially identified after the start position of the blanking data is identified.

In step 403, the apparatus for detecting video signals in the same format successively reads values of the incoming signal and makes comparison, so as to identify the start position and the end position of the valid video data according to the standard format of video signal.

In step 404, after identifying the starting position of the video valid data, rows and columns of the complete access data are counted and, then, the step 401 is performed.

Specifically, as the video signal data flow is detected by the apparatus for detecting video signals in the same format, when the video signal of the same format is quickly switched during the detection, for example, a certain location of video data (defined as video A) input from the video capture device A is detected before the switching, and the video data (defined as video B) input from the video capture device B is incoming after the switching. In other words, the apparatus was detecting a certain line of valid data in an image frame of video A before the switching, and then may detect any location in an image frame of video B after the switching. After switching to B, when the end position of valid data is detected, with combination of the previously detected start position of valid data in A, it can be determined whether the numbers of row and columns of the whole valid data conform with that of the previous data and, thus, it can be determined the switching occurs in the data if there is a mismatch.

Since the seamless connection is impossible between video data before and after the switching, the fast switching on video signal data of the same format can be detected precisely. The detection result is transmitted to the successive process module by the apparatus, such that issues like image splitting at the video conference terminal can be avoided after a corresponding process is performed by the successive process module.

According to still another aspect, the present disclosure provides an apparatus for detecting video signals in a same format, including: a processor; and a memory configured to store instructions executable by the processor; wherein the processor is configured to perform: receiving video signal data output from any one of at least two signal sources in a same format; identifying a start position and an end position of valid data from the received video signal data; counting number of rows and number of columns of a complete frame of received data according to the identified start and end positions of the valid data; and determining, when the counted numbers of rows and columns corresponding to two adjacent complete frames of data do not conform with each other, the received video signal data is switched, and sending out the determined result.

According to yet still another aspect, the present disclosure provides a non-transitory computer-readable storage medium having stored therein instructions that, when executed by a processor of a video processing device, causes the video processing device to perform a method for detecting video signals in a same format, the method including: receiving video signal data output from any one of at least two signal sources in a same format; identifying a start position and an end position of valid data from the received video signal data; counting number of rows and number of columns of a complete frame of received data according to the identified start and end positions of the valid data; and determining, when the counted numbers of rows and columns corresponding to two adjacent complete frames of data do not conform with each other, the received video signal data is switched, and sending out the determined result.

The foregoing is a preferred embodiment of the present invention. It should be noted that a number of improvements and modifications may be made by those skilled in the art that without departing from the principles of the invention set forth herein, which will fall within the scope of the invention.

What is claimed is:

1. A method for detecting video signals in a same format, comprising:
   receiving video signal data output from any one of at least two signal sources in a same format;
   identifying a start position and an end position of valid data from the received video signal data;
   counting number of rows and number of columns of a complete frame of received data according to the identified start and end positions of the valid data; and
   determining, when the counted numbers of rows and columns corresponding to two adjacent complete frames of data do not conform with each other, the received video signal data is switched, and sending out the determined result.

2. The method according to claim 1, further comprising: determining, when the counted numbers of rows and columns corresponding to two adjacent complete frames of data conform with each other, the received video signal data is not switched, and sending out the determined result.

3. The method according to claim 1, wherein the identifying a start position and an end position of valid data from the received video signal data comprises:
   identifying a start position and an end position of blanking data from the received video signal data; and
   identifying, beginning from the end position of the blanking data, the start and end positions of the valid data from the received video signal data.

4. The method according to claim 3, wherein the identifying a start position and an end position of blanking data from the received video signal data comprises:

identifying the start and end positions of the blanking data by comparing the received video signal data with video signal of a standard format.

5. The method according to claim 3, wherein the identifying, beginning from the end position of the blanking data, the start and end positions of the valid data from the received video signal data comprises:

comparing, beginning from the end position of the blanking data, the received video signal data with video signal of a standard format to identify the start and end positions of the valid data.

6. The method according to claim 1, wherein, when the video signal data is analog video signal data, the method, prior to the receiving video signal data output from any one of at least two signal sources in a same format, comprises:

converting the analog video signal data into digital video signal data.

7. A video conference system comprising at least two video capture devices, a video switching matrix device, and a video conference terminal, wherein the video conference terminal comprises an apparatus for detecting video signals in a same format comprising:

a processor; and
a memory configured to store instructions executable by the processor;
wherein the processor is configured to perform:
receiving video signal data output from any one of at least two signal sources in a same format;
identifying a start position and an end position of valid data from the received video signal data;
counting number of rows and number of columns of a complete frame of received data according to the identified start and end positions of the valid data; and
determining, when the counted numbers of rows and columns corresponding to two adjacent complete frames of data do not conform with each other, the received video signal data is switched, and sending out the determined result.

8. The video conference system according to claim 7, wherein the video conference terminal further comprises a successive processor configured to receive determined result and video signal transmitted from the apparatus for detecting video signals in a same format, and process the received video signal.

9. An apparatus for detecting video signals in a same format, comprising:

a processor; and
a memory configured to store instructions executable by the processor;
wherein the processor is configured to perform:
receiving video signal data output from any one of at least two signal sources in a same format;
identifying a start position and an end position of valid data from the received video signal data;
counting number of rows and number of columns of a complete frame of received data according to the identified start and end positions of the valid data; and
determining, when the counted numbers of rows and columns corresponding to two adjacent complete frames of data do not conform with each other, the received video signal data is switched, and sending out the determined result.

10. The apparatus according to claim 9, wherein the processor is further configured to perform: determining, when the counted numbers of rows and columns corresponding to two adjacent complete frames of data conform with each other, the received video signal data is not switched, and sending out the determined result.

11. The apparatus according to claim 9, wherein in the identifying a start position and an end position of valid data from the received video signal data, the processor is configured to perform:

identifying a start position and an end position of blanking data from the received video signal data; and
identifying, beginning from the end position of the blanking data, the start and end positions of the valid data from the received video signal data.

12. The apparatus according to claim 11, wherein in the identifying a start position and an end position of blanking data from the received video signal data, the processor is configured to perform:

identifying the start and end positions of the blanking data by comparing the received video signal data with video signal of a standard format.

13. The apparatus according to claim 11, wherein in the identifying, beginning from the end position of the blanking data, the start and end positions of the valid data from the received video signal data, the processor is configured to perform:

comparing, beginning from the end position of the blanking data, the received video signal data with video signal of a standard format to identify the start and end positions of the valid data.

14. The apparatus according to claim 9, wherein, when the video signal data is analog video signal data, the processor is configured to, prior to the receiving video signal data output from any one of at least two signal sources in a same format, perform:

converting the analog video signal data into digital video signal data.

* * * * *